Patented Sept. 12, 1950

2,522,409

UNITED STATES PATENT OFFICE 2,522,409

PRODUCTION OF SPROUTED LEGUMES

Benjamin B. Stoller, Duluth, Minn., assignor to Lennys Foods, Inc., Duluth, Minn., a corporation of Minnesota No Drawing. Application September 6, 1946, Serial No. 695,296

9 Claims. (Cl. 71—2.1)

This invention relates to the production of sprouted legumes or, as they are more commonly known, bean sprouts, and is more particularly concerned with a process for causing an abnormal or unnatural sprouting of legume seeds to produce unnaturally large and plump hypocotyls without roots or only a vestige of a root.

Sprouted legumes, the so-called Chinese dishes in America, constitute one of the chief fresh vegetable ingredients in the diet of oriental populations. Since the discovery that the sprouted legumes are rich in vitamins, especially vitamin C, and high in proteins but relatively low in carbohydrates, their use in America has increased considerably. By sprouting, an indigestible legume is converted into a vitamin-rich, easily digestible food.

Many legumes may be used for sprouting, such as different varieties of the following: the mung bean (*Phaseolus aureus* Roxb.) and (*Phaseolus mungo* L.), soybean (*Glycine max* Merr), cowpeas (*Vigna sinensis*), garbanzo (*Cicer arietinum*), patani (*Phaseolus lunatus* L.), tapilan (*Phaseolus calcaratus* L.), cadios (*Cajanus cajan* Springl.) and the winged bean (*Psophocarpus tetragonolabus* L.) The two legumes most commonly eaten as sprouts are different varieties of the soybean and the mung bean. At present the mung bean is the only legume used in the large scale production of sprouts. However, according to Capinpin (Philippine Agriculturist, vol. 27, pages 96–103, 1938), soybean sprouts are considered superior to all the others in palatability.

In oriental countries the legumes are sprouted in small containers and considerable manpower is required in their production. The legumes are soaked in water for about eight hours or until most of the hulls split open and then they are placed in tubs or crocks which have been provided with adequate drainage. Subsequently they are sprinkled with water at room temperature about three times a day. The sprouts are usually ready for use in about four to six days, depending upon the room temperature. The hulls are laboriously removed by paddling the sprouts in large tubs of cold water. Thus, while producing sprouts on a small scale is a relatively simple process, requiring only crude equipment, the amount of labor involved is inordinate.

During the past ten years, large scale production of sprouts on a commercial basis has been increasing. The present commercial methods in America, however, are essentially the same as the oriental methods, except that containers for growing sprouts are larger. In appraising the present method of growing sprouts, Beskow (Michigan Agricultural Experimental Station, Tec. Bul. #184, June 1944) states that "Unfortunately the sprouts thus produced in large commercial tanks are not uniform in size and shape. Those which develop near the bottom of the tanks are usually short and hard. Those in the upper ten inches of the bean sprout mass are long, fibrous, tough, rooty and are unsalable Since the total depth of the bean sprout mass is about 36 inches the loss because of the poor development in the upper ten inches is quite sizable."

Attempts at improvements have been largely in plant sanitation, separating the hulls from sprouts, removing the roots from the sprouts, and producing more uniform sprouts. While contamination of sprouts by microorganism or "sourness" is still common, better sanitation has generally been obtained. Devices for removing hulls and roots are considered unsatisfactory and are rather expensive. Beskow, however, has proposed a method of producing a more uniform sprout. He discovered that under experimental conditions relatively uniform sprouts are obtained when the sprouts are grown in an atmosphere containing 10% carbon dioxide, 10% oxygen and 80% nitrogen. However, considerably expensive equipment and controls are required in following his method. Furthermore, the sprouts are still relatively rooty and there is still some variation in the sprouts growing from the top to the bottom of the tanks.

Accordingly, the disadvantages of the present known methods of producing sprouts are as follows: The sprouts have long, thread-like roots which make the product less palatable and which are expensive to remove. These roots are conducive to packing of the sprouts in the growing tank and, since packing is favorable to overheating and anaerobic conditions, the sprouts become more susceptible to contamination by microorganisms. The sprouts are not uniform in size and shape and are frequently tough and stringy. Finally, hulls are difficult and expensive to separate from the sprouts.

The foregoing and other difficulties and disadvantages attending present-day processes for sprouting legume seeds are overcome by the process of the present invention in which a uniform, stout sprout without primary or secondary roots, is produced by soaking the legume seeds in water containing minute quantities of certain chemicals, to be defined hereinafter, or by exposing the seeds to vapors of said chemicals. By modification of the present process, a sprout can also be grown which is not only without root but also without hull.

Other distinct advantages of the process are: (1) The rootless sprouts obtained are more palatable; (2) they are less susceptible to packing and souring; (3) they are uniformly thick or plump throughout the depth of the tank or vat in which they are grown, and can be grown to any desirable length, wtihout greatly sacrificing their plumpness; (4) they are of a better quality, containing more vitamin C; (5) the hulls are easily washed off, since there is no binding by roots, or the hulls may be removed prior to sprouting; and (6) the chemical treatment is easily applied and inexpensive since only minute quantities of chemicals are required.

Before proceeding with the description of the present invention, it should be carefully borne in mind that ordinary seed germination in no way is involved. In ordinary seed germination the hypocotyl is present only in the early embryonic stages and is quickly transformed into root development. The present process, on the other hand, involves a novel treatment of legume seeds whereby the latter undergo abnormal and unnatural sprouting to produce an unnaturally large, plump hypocotyl, with no roots or only a vestige of a root. This latter feature of positively and totally preventing or inhibiting root formation ab initio with consequent abnormal hypocotyl formation is a very important feature of the invention and a fundamental discovery in this art.

As heretofore generally indicated, the foregoing advantages in the art of legume sprouting are attained, in the preferred embodiment of the invention, by a preliminary soaking of the legume seeds in water containing only a few milligrams per liter of certain chemicals, and then allowing the treated seeds to sprout in vats or tanks. Useful in the process of the present invention are certain phenoxy aliphatic acids, substituted or unsubstituted, and their salts, esters and amides, effective to bring about the specified advantages. When unsubstituted phenoxy aliphatic acids are employed, the alpha form rather than the beta form must be employed. It is also within the contemplation of the invention to employ phenoxy aliphatic acids in which halogens are substituted in the benzene ring, so that one of these halogens is always present in the para or "4" position. Salts, esters and amides of these halogen derivatives are likewise contemplated. The halogen substituted may be chlorine, bromine, iodine or fluorine, but chlorine is preferred. The aliphatic acids, of course, may be acetic, propionic, butyric, etc. Exemplary of specific compounds useful in the practice of the invention are alpha phenoxy acetic acid, alpha phenoxy propionic acid, alpha phenoxy butyric acid, para chlorophenoxy acetic acid, 2,4 dichlorophenoxy acetic acid, and methyl or ethyl ester of para chlorophenoxy acetic acid.

The quantity of chemicals required is in the range of 0.1 to 200 milligrams per liter of water in which the seeds are soaked. The quantity employed depends upon the species and variety of the seeds and the temperature at which the seed is soaked. At lower temperatures, more of these chemicals are required and, conversely, at higher temperatures less. Also, higher concentrations are permissible when the seeds are soaked or dipped for shorter periods.

After the seeds are treated with these chemicals, they are planted in vats or tanks in the usual manner and allowed to sprout for three to seven days. While it is easier to apply the chemicals to the seeds when soaking, the chemicals can also be applied in the water with which the sprouts are sprinkled during the three to seven days the sprouts are allowed to grow, or, as stated hereinbefore, the seeds may be subjected to vapors of the chemicals during the sprouting period.

The seeds may be soaked from 50° F. to 120° F., although they are usually soaked at 70° F. to 100° F. Less of the chemicals mentioned above are required at the higher temperatures. The length of time the seeds are soaked may vary from a few minutes to twenty-four hours, although usually the seeds are soaked six to twelve hours. The length of soaking time depends upon the temperatures employed and naturally the soaking may be shorter at the higher temperatures. Less of the chemicals are required for longer periods of soaking, but the quantities employed depend likewise upon the variety of the seed, the temperature and methods of aeration mentioned below.

The invention also contemplates a procedure whereby the hulls are removed from the seeds while they are soaking in the treating water, so that the seeds may be arranged for sprouting without hulls. In this process the seeds are soaked in tanks provided with a manifold for bubbling air or oxygen into the water. Bubbling the air through porous stone has been found satisfactory. Aeration of the soaking water has been found conducive to the shedding of the hulls, so that many of the hulls float to the surface of the water and leave the naked seed submerged. The addition of activated oxygen to the water, such as contained in peroxides or ozone, or produced by ultra- or supersonic waves, facilitates the rapidity with which the hulls are removed.

Some of the hulls which have been separated from the seeds remain submerged, but they are quickly floated to the surface by adding a wetting agent to the soaking water. By the implementation of the wetting agent and the bubbling of air, or the various forms of oxygen, all the hulls that have been separated are floated to the surface and skimmed off. While as many as 90% of the hulls of some varieties of legumes have been separated during this soaking operation, the average for most legumes is about 75%. Accordingly, to remove the remaining hulls, the seeds are sprayed with a relatively strong stream of water. The seeds on which the hull still persist are separated by means of a photoelectric cell, and are either grown separately or soaked for a longer period, depending upon the variety of the bean. It is simple to make a photoelectric separation, since the hulls, or seeds with hulls, are a dark color, whereas the naked seed is usually a light cream color.

The following specific examples are given herein by way of illustration but not by limitation:

*Example I*

Eleven pounds of mung beans are soaked in forty-four liters of water containing forty-four milligrams of parachlorophenoxyacetic acid (mol. wt. 186.59, M. P. 157–159° C.). The initial temperature of the water is 100° F. and is allowed to fall to room temperature (approximately 70° F.) during the soaking period of eight hours. While the seeds are soaking, they may be stirred mechanically, or the solution in which they are soaking is stirred or agitated by a propeller or pump, or gas such as air or oxygen. After this soaking, the beans are placed in a vat 14" x 22" x 22" high, flushed with water and allowed to sprout. The beans may be covered with a burlap bag to prevent excessive evaporation. The beans are sprinkled with water every six hours for a period of about five days. The initial temperature of the water is 80° F., and is gradually lowered to 60° F., depending upon the rapidity of the growth of the sprouts. After about five days the sprouts are harvested, washed in large tanks of cold water by spraying with streams of water, paddled and floated about, so that most of the hulls are separated. The sprouts are then ready for marketing.

Example II

Twenty-two pounds of beans are soaked in forty-four liters of water containing eighty-eight milligrams of p-chlorophenoxyacetic acid. The conditions and procedure are the same as in Example I, except that the beans are sprinkled with water at a temerature of 85° F., although it may be lowered if the temperature of the sprouts in the vat rises above 90° F.-95° F.

Example III

Eleven pounds of mung beans are soaked in forty-four liters of water containing forty-four milligrams of p-chlorophenoxyacetic acid and 200 ml. of 3% $H_2O_2$. Air is bubbled through porous stone in the bottom of the vat. The temperature of the water is maintained at 100° F. for about twelve hours. The hulls floating to the surface of the water are skimmed off and a small quantity of a wetting agent (example—0.0005% Aerosol) is then dissolved in the soaking water. The remaining hulls which have been submerged are floated to the surface and skimmed off. The beans are now moved over a conveyor and sprayed with a strong stream of water, so that more of the persistent hulls are removed. Finally, the beans are conveyed for photoelectric cell color separation. The beans with persistent hulls are then soaked for a long period or planted separated, depended upon the variety of the bean. The beans with hulls removed are then planted in vats and sprinkled with water as described under Example I. However, after the full sprout is grown, the sprouts are ready for marketing without further washing.

Example IV

The dry beans, or the beans which have been soaked for various lengths of time, are exposed to an atmosphere containing the vapors of the methyl or ethyl ester of p-chlorophenoxy acetic acid for a period of from a few hours to a few days, depending upon the amount of moisture absorbed by the beans. The beans may be allowed to continue to grow in this special atmosphere or planted as described under Example I.

I claim:

1. A process for producing legume sprouts which comprises soaking legume seeds for a few minutes to 24 hours at a temperature of 50–120° F. in an aqueous solution containing 0.1 to 200 milligrams per liter of a phenoxy aliphatic acid, and then allowing the treated seeds to develop into rootless sprouts having unnaturally large and plump hypocotyls.

2. The process of claim 1 wherein the phenoxy aliphatic acid is para-chlorophenoxy-acetic acid.

3. The process of claim 1 wherein the phenoxy aliphatic acid is alpha phenoxy propionic acid.

4. The process of claim 1 wherein the phenoxy aliphatic acid is 2,4 dichlorophenoxyacetic acid.

5. A process for producing legume sprouts which comprises soaking legume seeds in an aqueous solution of a phenoxy aliphatic acid, agitating to loosen the hulls from the seeds, removing the hulled seeds from the treating bath, and then allowing the treated seeds to develop into rootless sprouts having unnaturally large and plump hypocotyls.

6. A process for producing legume sprouts which comprises soaking legume seeds in an aqueous solution of a phenoxy aliphatic acid, agitating to loosen the hulls from the seeds by bubbling an oxygen-containing gas through the treating bath, removing the hulled seeds from the treating bath, and then allowing the treated seeds to develop into rootless sprouts having unnaturally large and plump hypocotyls.

7. A process for producing legume sprouts which comprises soaking legume seeds for 6–12 hours at a temperature of 50–120° F. in an aqueous solution containing 0.1 to 200 milligrams per liter of para chlorophenoxyacetic acid, agitating to loosen the hulls from the seeds by bubbling an oxygen-containing gas through the treating bath, removing the hulled seeds from the treating bath, and placing them in a sprouting vat, sprinkling the seeds with water periodically for 3–7 days, and then harvesting the resulting rootless sprouts having unnaturally large and plump hypocotyls.

8. A process for producing legume sprouts which comprises soaking legume seeds for 6–12 hours at a temperature of 50–120° F. in an aqueous solution containing 0.1 to 200 milligrams per liter of alpha phenoxy propionic acid, agitating to loosen the hulls from the seeds by bubbling an oxygen-containing gas through the treating bath, removing the hulled seeds from the treating bath, and placing them in a sprouting vat, sprinkling the seeds with water periodically for 3–7 days, and then harvesting the resulting rootless sprouts having unnaturally large and plump hypocotyls.

9. A process for producing legume sprouts which comprises soaking legume seeds for 6–12 hours at a temperature of 50–120° F. in an aqueous solution containing 0.1 to 200 milligrams per liter of 2,4 di-chlorophenoxyacetic acid, agitating to loosen the hulls from the seeds by bubbling an oxygen-containing gas through the treating bath, removing the hulled seeds from the treating bath, and placing them in a sprouting vat, sprinkling the seeds with water periodically for 3–7 days, and then harvesting the resulting rootless sprouts having unnaturally large and plump hypocotyls.

BENJAMIN B. STOLLER.

REFERENCES CITED

The following references are of record in the file of this patent:

UNITED STATES PATENTS

| Number | Name | Date |
|---|---|---|
| 2,322,761 | Lontz | June 29, 1943 |
| 2,341,868 | Hitchcock | Feb. 15, 1944 |

OTHER REFERENCES

Went et al.: "Phytohormones," published 1937 by MacMillan Co., N. Y., 294 pages in all, pages 21, 140 through 150, 222 through 229, can suffice.